Dec. 24, 1968   J. TATE   3,418,003
POWER UNIT MOUNTING

Filed April 21, 1966   2 Sheets-Sheet 1

INVENTOR.
JOHN TATE
BY
Attorney.

Dec. 24, 1968   J. TATE   3,418,003
POWER UNIT MOUNTING
Filed April 21, 1966   2 Sheets-Sheet 2
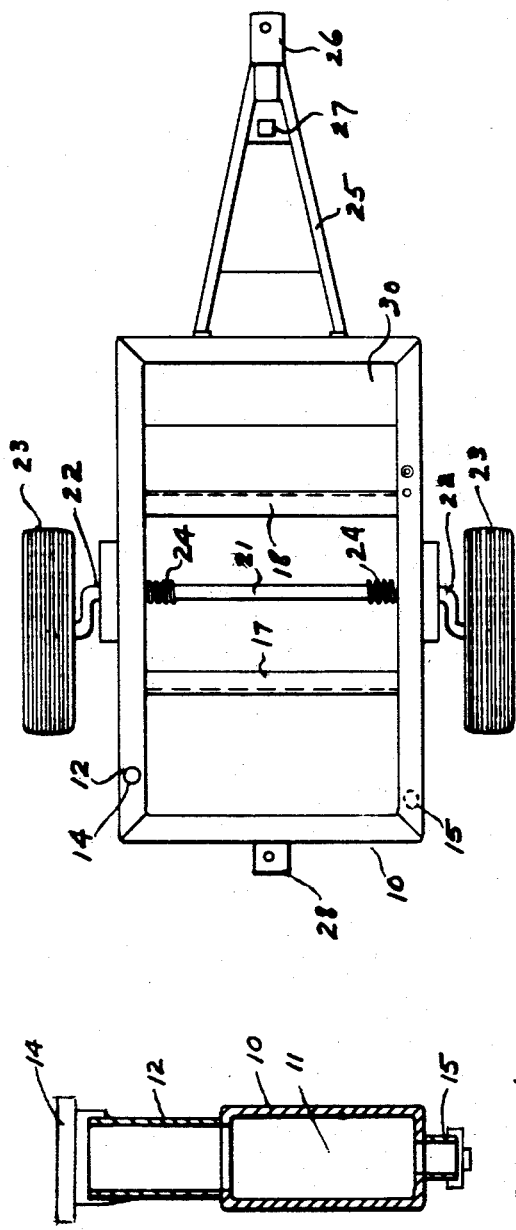
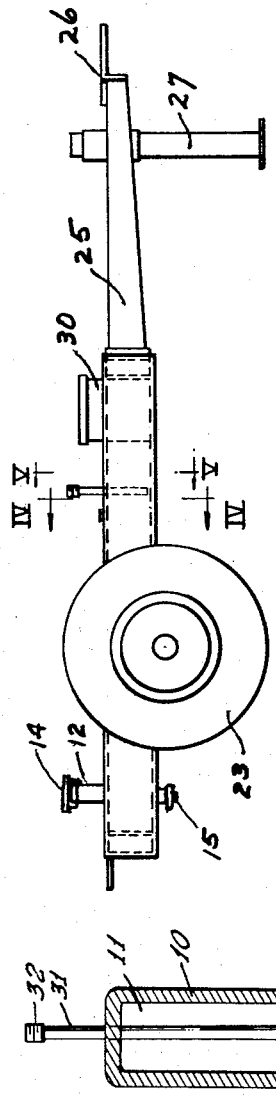
INVENTOR.
JOHN TATE

United States Patent Office 3,418,003
Patented Dec. 24, 1968

3,418,003
POWER UNIT MOUNTING
John Tate, 207 North St., Sausalito, Calif. 94965
Filed Apr. 21, 1966, Ser. No. 544,303
3 Claims. (Cl. 280—5)

ABSTRACT OF THE DISCLOSURE

A portable power unit mounting in the form of a wheeled rectangular frame having hollow rectangular frame members interconnected to form an endless toroidal fuel tank for a power plant mounted on brace members connecting the sides of the frame. A tank filling opening and fuel supply and fuel return connections are provided on the hollow frame members and one end of the frame is provided with a hitch member to permit the portable power unit mounting to be towed from one place to another by another vehicle.

---

The invention is directed to a mounting for internal combustion engines and driven apparatus which mounting is also a fuel tank.

The mountings of the prior art have been designed for structural strength and have had a fuel supply container mounted on and carried by the frame which not only reduced the available space for equipment on the frame, but raised the center of gravity thereof. Such engine mountings often included wheels for portability and easy mobility and therefore such equipment often operates in remote locations. When such units are refueled it is done under field conditions with frequent spillage of the fuel over the engine and other parts of the operating equipment. Such spillage causes a wet surface which results in the accumulation of dirt, dust and other foreign matter adhering to the wet exposed parts of the engine and other equipment, thereby causing overheating and reducing the engine life.

It is therefore a prime object of the present invention to provide an engine mounting which not only overcomes the difficulties necessarily involved in the prior art designs, but which provides unexpected advantages such as a lower center of gravity, a greater fuel capacity, a simplification of design for engine and driven equipment, and many other factors which will be readily apparent to those skilled in this art.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invenion is capable of modification and change and comprehends other details of constructon without departing from the spirit thereof or the scope of the appended claims.

Referring now to the drawings:

FIGURE 2 is a plan view of the engine mounting without the engine and the driven equipment mounted thereon;

FIGURE 3 is a side elevational view of the equipment shown in FIGURE 2;

FIGURE 4 is a cross section of the frame member taken on the line IV—IV of FIGURE 3, on an enlarged scale; and FIGURE 5 is a cross-section of the frame member taken on the line V—V of FIGURE 3 on an enlarged scale, and showing the fuel return pipe.

Figure 1:
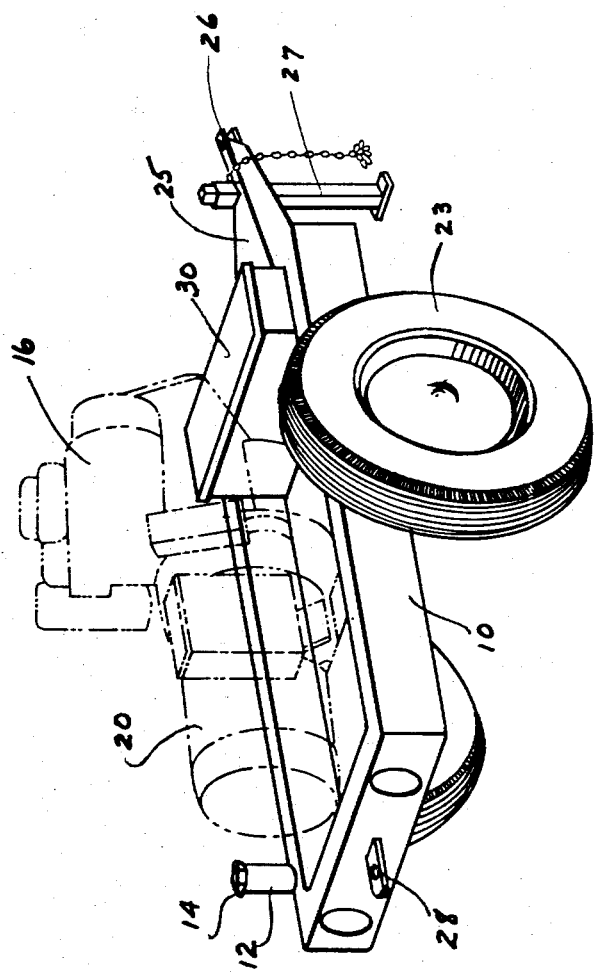
FIGURE 1 is a perspective view of the engine mounting complete with an internal combustion engine mounted thereon and with a standard generator which is driven by the engine.

Referring now more particularly to the drawings in which like reference numerals indicate like parts in the several views, the completed unit is shown in FIGURE 1. This includes a rectangular frame 10 which is of tubular steel, rectangular in cross-section, either seamless steel tubing or factory continuous welded. The frame is preferably of welded construction for strength and rigidity and has its internal hollow portion in open communication on all sides so as to provide a completely communicating chamber 11. The access to the internal chamber 11 is provided by the filling spout 12 which is mounted adjacent the rear end of the frame 10 to be well away from the engine and any driven equipment to minimize the possibility of accidental spillage of fuel over the power plant, in order to eliminate the risk of overheating and excessive wear due to dirt formation on the cylinder cooling fins and other portions of the engine. The filling spout 12 is closed with a suitable cap 14 which is preferably a breather type cap for safety, although any suitable type of cap may be used. On the underneath side of the frame there is a drain cock 15 which is provided at a point of easy access for complete draining. The inner chamber 11 is also connected to the internal combustion engine 16 with a suction fuel line 31 which is provided with a threaded end 32 for connection, to make certain of a positive flow of fuel from the chamber 11 to the internal combustion engine regardless of the particular attitude of the engine mounting at the time. In the case of diesel engines, a return fuel line 31 is also required, but this, too, is part of the general art which is known.

Intermediate of the longitudinal ends of the frame 10 are two or more transverse spreader bars or braces 17 and 18. More of these may obviously be provided if the occasion requires it. These transverse bars not only provide rigid structural strength for the rectangular frame 10 and its chamber 11, but also provide for the four-point shock mounting of the internal combustion engine 16 and flexible coupling for its driven equipment which in the case shown in FIGURE 1 is a generator 20. It is apparent that the mounting of the engine 16 and its driven equipment 20 can be mounted lower than heretofore and within the confines of the frame 10, for protection and for better roadability, if the power unit is to be mobile as is shown in the figures.

To make the equipment mobile, there is a transverse bar 21 with trailing axles 22 on which are mounted suitable wheels 23. The trailing axles 22 are mounted with torsion type springs 24 for either off highway or high-speed towing on the highway. In order to provide the towing or mobility of the unit an A-type towing tongue 25 is provided, and mounted at the apex is a suitable towing hitch 26. An adjustable front stand 27 is also carried by the A-frame 25 in order to provide stability when the unit is positioned for operation and to assist in leveling the unit for operation. Also, a towing hitch 28 is provided at the rear end of the frame so that this unit may tow something else, or again, it may be used to pull it backwards.

With the space provided by the frame 10 itself and the reduction of its size due to the elimination of separately mounted fuel containers, it is possible to provide as a part of the frame a lockable steel box 30 which is a combined battery and tool box. It is necessary to carry tools for making simple repairs and adjustments on all portable equipment and also it is necessary to have batteries. Such equipment is often left unattended overnight in remote locations and it becomes apparent that it is necessary to lock the container to provide some safe housing for the battery and tools. It will be observed that the lockable battery and tool box 30 forms a part of the frame on the internal portion thereof, to further give rigidity and structural strength to the entire combination.

It wll be observed that the frame 10 provides a connecting continuous chamber 11 on all sides of the frame. This chamber is the fuel chamber for the unit and because of its extent, provides sufficient fuel capacity for a minimum of twelve hours continuous fuel load operation, which is not possible to accomplish with existing equipment. The fuel capacity provided by outside tanks is, of course, limited by the space requirements and the weight requirements particularly if highway travel is contemplated. Up to the present time no outside mounted fuel tank provided sufficient fuel for more than a few hours operation which means that there is a necessity to transport fuel once or twice each day to the unit if it is to be operated. The elimination of these logistic problems is a great benefit in and of itself.

It is apparent that the wheels 23 and their various mountings may be eliminated to provide a portable unit which is ertremely lightweight. If a portable unit is provided the A-frame 25 and its cooperating members may be eliminated also. What has been said as to mobility and portability are prime factors in the benefits and the availability of the equipment. However, this does not exclude similar benefits for stationary units which use the same rectangular frame 10 as the mounting for the engine and the driven members such as pumps, generators, air compressors and welding units. This combination develops a unit whether it be mobile, portable or stationary, which has safe and increased fuel capacity, which by its very nature eliminates the refueling problems and spillage results, although including a complete power unit.

I claim:

1. In a portable power unit a rectangular tubular frame for holding combustible fluids having a hollow rectangular cross-section providing a continuous uninterrupted and endless chamber of substantial capacity said frame lying in a horizontal plane, noncommunicating transverse brace members attached at either end internally within said frame, equipment including an internal combustion engine mounted on and carried by said brace members within said tubular frame, a suction fuel line connecting said internal combustion engine intake to said fuel chamber, and driven equipment, driven by and connected to said engine.

2. The unit of claim 1 wherein the internal combustion engine is a diesel engine having a return fuel line from said engine to said fuel chamber.

3. The unit of claim 1 where the said frame is mounted on wheels for mobility and where a towing tongue and hitch are attached to the frame.

References Cited

UNITED STATES PATENTS

| | | | |
|---|---|---|---|
| 689,001 | 12/1901 | Hill | 180—54 |
| 1,343,682 | 6/1920 | Richmond. | |
| 2,032,568 | 3/1936 | Fogh | 180—54 |

FOREIGN PATENTS 990,426  6/1951  France.

BENJAMIN HERSH, *Primary Examiner.*

MILTON L. SMITH, *Assistant Examiner.*

U.S. Cl. X.R.

180—64